United States Patent
Matsumoto et al.

(10) Patent No.: US 10,479,229 B2
(45) Date of Patent: Nov. 19, 2019

(54) VEHICLE SEAT APPARATUS

(71) Applicant: HONDA MOTOR CO., LTD., Minato-ku, Tokyo (JP)

(72) Inventors: Manabu Matsumoto, Wako (JP); Muneatsu Minato, Wako (JP); Hajime Ishihara, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 9 days.

(21) Appl. No.: 15/920,580

(22) Filed: Mar. 14, 2018

(65) Prior Publication Data

US 2018/0281623 A1    Oct. 4, 2018

(30) Foreign Application Priority Data

Apr. 3, 2017  (JP) .................................. 2017-073952

(51) Int. Cl.
  *B60N 2/02*    (2006.01)
  *B60N 2/14*    (2006.01)
(52) U.S. Cl.
  CPC ......... *B60N 2/0244* (2013.01); *B60N 2/0232* (2013.01); *B60N 2/14* (2013.01); *B60N 2002/0236* (2013.01)
(58) Field of Classification Search
  CPC .... B60N 2002/0236; B60N 2002/0272; B60N 2/0244; B60N 2/0232; B60N 2/14
  USPC .................................................. 297/344.21
  See application file for complete search history.

(56) References Cited

U.S. PATENT DOCUMENTS

| 5,522,643 | A  | * | 6/1996  | Matsuura  | B60N 2/2354 |
| | | | | | 297/367 R |
| 10,046,675 | B1 | * | 8/2018  | Whitens  | B60N 2/14 |
| 2011/0018324 | A1 | * | 1/2011  | Horiguchi | B60N 2/0224 |
| | | | | | 297/344.22 |
| 2012/0261955 | A1 | * | 10/2012 | Iida | B60N 2/0252 |
| | | | | | 297/188.04 |

(Continued)

FOREIGN PATENT DOCUMENTS

| JP | 61-278438 | 12/1986 |
| JP | 05-005551 | 1/1993 |

(Continued)

OTHER PUBLICATIONS

Japanese Office Action for Japanese Patent Application No. 2017-073952 dated Nov. 13, 2018.

*Primary Examiner* — Mark R Wendell
(74) *Attorney, Agent, or Firm* — Amin, Turocy & Watson LLP (57) ABSTRACT

A vehicle seat apparatus includes: a seat main body configured to seat an occupant; a first gear that is joined to the seat main body; a second gear that is capable of being engaged with the first gear; a rotation mechanism that rotates the second gear in a state of being engaged with the first gear and that rotates the seat main body in a yaw direction from a reference direction; a biasing part that applies, when the seat main body is rotated by the rotation mechanism, a biasing force in a direction that is opposite to a rotation direction; and a release control part that releases an engagement between the first gear and the second gear, that rotates the seat main body by a biasing force which is preliminarily biased by the biasing part, and that allows the seat main body to return to the reference direction.

7 Claims, 9 Drawing Sheets

(56) References Cited

U.S. PATENT DOCUMENTS

2014/0062155 A1* 3/2014 Honma .................. B60N 2/14
297/338

FOREIGN PATENT DOCUMENTS

| JP | 09-161196 | 6/1997 |
| JP | 2009-101762 | 5/2009 |
| JP | 2016-168972 | 9/2016 |

* cited by examiner

VEHICLE SEAT APPARATUS

CROSS-REFERENCE TO RELATED APPLICATION

Priority is claimed on Japanese Patent Application No. 2017-073952, filed on Apr. 3, 2017, the contents of which are incorporated herein by reference.

BACKGROUND

Field of the Invention

The present invention relates to a vehicle seat apparatus.

Background

In the related art, a technique is disclosed relating to a rotation mechanism that rotates a seat main body on which an occupant is seated in a yaw direction using an electric motor (for example, refer to Japanese Patent Application, Publication No. S61-278438A).

SUMMARY

However, according to the technique of the related art, the rotation speed of the seat main body depends on the performance of the electric motor, and therefore, there may be cases in which it is not possible to allow the seat main body to promptly return to a position at which it is possible to drive.

An object of an aspect of the present invention is to provide a vehicle seat apparatus that is capable of allowing a seat main body to promptly return to a position at which an occupant can drive.

(1) A vehicle seat apparatus according to an aspect of the present invention includes: a seat main body configured to seat an occupant; a first gear that is joined to the seat main body; a second gear that is capable of being engaged with the first gear; a rotation mechanism that rotates the second gear in a state of being engaged with the first gear and that rotates the seat main body in a yaw direction from a reference direction; a biasing part that applies, when the seat main body is rotated by the rotation mechanism, a biasing force in a direction that is opposite to a rotation direction; and a release control part that releases an engagement between the first gear and the second gear, that rotates the seat main body by a biasing force which is preliminarily biased by the biasing part, and that allows the seat main body to return to the reference direction.

(2) The above vehicle seat apparatus may further include a regulation part that regulates a rotation speed of the seat main body when the biasing part allows the seat main body to return to the reference direction.

(3) In the above vehicle seat apparatus, the biasing part may apply a biasing force to a rotation shaft that rotates the seat main body in a yaw direction.

(4) In the above vehicle seat apparatus, the release control part may release the engagement between the first gear and the second gear when automated driving in which at least one of acceleration/deceleration and steering of a vehicle is automatically controlled is switched to manual driving.

(5) The above vehicle seat apparatus may further include an information output part which notifies that the seat main body will be rotated of an occupant before the release control part releases the engagement between the first gear and the second gear.

(6) The above vehicle seat apparatus may further include a reception part that receives an operation by the occupant, wherein the release control part may release the engagement between the first gear and the second gear when an operation that allows the seat main body to return to the reference direction is received by the reception part.

(7) In the above vehicle seat apparatus, the release control part may allow the first gear and the second gear to be in an engaged state when the seat main body returns to the reference direction.

According to the configuration (1) described above, it is possible to allow the seat main body to promptly return to a position at which the occupant can drive.

According to the configuration (2) described above, for example, the rotation speed is reduced immediately before the seat main body returns to the reference direction, and thereby, it is possible to stop the seat main body smoothly in the reference direction.

According to the configuration (3) described above, it is possible to efficiently apply a biasing force to the rotation shaft.

According to the configuration (4) described above, it is possible to allow the seat main body to promptly return to the position at which the occupant can drive when automated driving is switched to manual driving. Accordingly, the occupant can take a pose for performing manual driving early.

According to the configuration (5) described above, the occupant can be made aware that the seat main body will be rotated and return to the reference direction before the seat main body is rotated.

According to the configuration (6) described above, it is possible to allow the seat main body to return to the reference direction on the basis of a command of the occupant.

According to the configuration (7) described above, the first gear and the second gear are made to be an engaged state again in a state where the seat main body returns to the reference direction, and thereby, it is possible to fix the seat main body.

DESCRIPTION OF THE EMBODIMENTS

Hereinafter, an embodiment of a vehicle seat apparatus of the present invention will be described with reference to the drawings. In the embodiment, it is assumed that the vehicle seat apparatus is applied to an automated driving vehicle.

The automated driving is, for example, controlling at least one of acceleration/deceleration and steering of a vehicle automatically and allowing the vehicle to travel.

[Entire Configuration]

Figure 1:
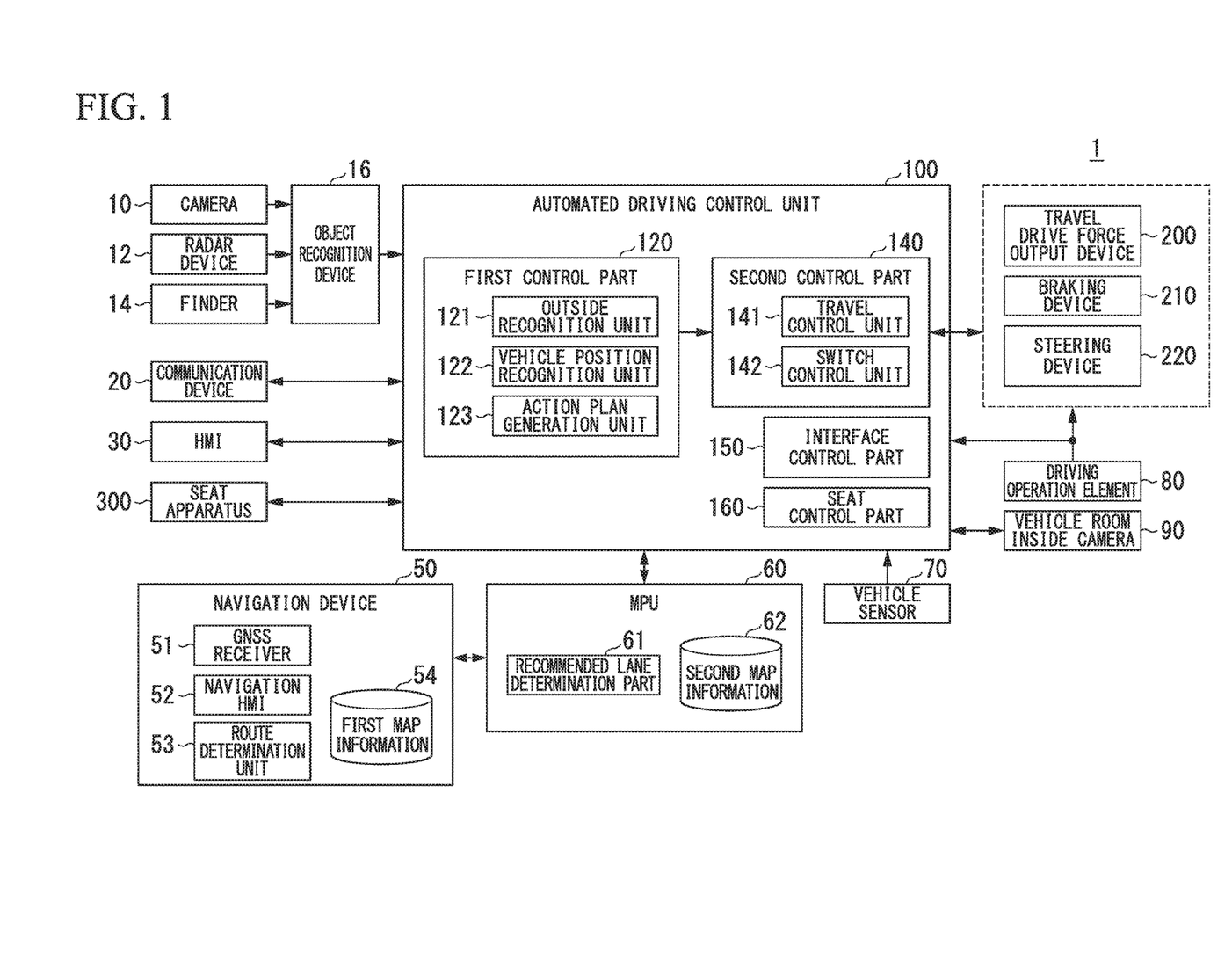
FIG. 1 is a configuration view of a vehicle system that includes a vehicle seat apparatus.

FIG. 1 is a configuration view of a vehicle system 1 that includes a vehicle seat apparatus. A vehicle (hereinafter, referred to as a vehicle M) on which the vehicle system 1 is mounted is, for example, a vehicle having two wheels, three wheels, four wheels, or the like. A drive source of the vehicle on which the vehicle system 1 is mounted is an internal combustion engine such as a diesel engine or a gasoline engine, an electric motor, or the combination of the internal combustion engine and the electric motor. The electric motor is operated by using generated electric power by a generator that is connected to the internal combustion engine or discharged electric power of a secondary battery or a fuel cell.

The vehicle system 1 includes, for example, a camera 10, a radar device 12, a finder 14, an object recognition device 16, a communication device 20, a HMI (Human Machine Interface) 30, a navigation device 50, a MPU (Micro-Processing Unit) 60, a vehicle sensor 70, a driving operation element 80, a vehicle room inside camera 90, an automated driving control unit 100, a travel drive force output device 200, a braking device 210, a steering device 220, and a seat apparatus 300. The devices and equipment are mutually connected by a multiplex communication line such as a CAN (Controller Area Network) communication line, a serial communication line, a wireless communication network, or the like. The configuration shown in FIG. 1 is an example; part of the configuration may be omitted, and another configuration may be further added. The HMI 30 is an example of an "information output part".

The camera 10 is, for example, a digital camera that uses a solid-state imaging element such as a CCD (Charge-Coupled Device) or a CMOS (Complementary Metal Oxide Semiconductor). One or more cameras 10 are attached to an arbitrary part of the vehicle M on which the vehicle system 1 is mounted. When a frontward direction is imaged, the camera 10 is attached to an upper part of a front window shield, a rear surface of a room mirror, or the like. When a rearward direction is imaged, the camera 10 is attached to an upper part of a rear window shield, a rear door, or the like. When a lateral direction is imaged, the camera 10 is attached to a door mirror or the like. The camera 10, for example, periodically and repeatedly captures an image in the vicinity of the vehicle M. The camera 10 may be a stereo camera.

The radar device 12 radiates radio waves such as millimeter waves to the vicinity of the vehicle M, detects the radio waves (reflected waves) that are reflected by an object, and detects at least a position (distance and azimuth) of the object. One or more radar devices 12 are attached to an arbitrary part of the vehicle M. The radar device 12 may detect the position and the speed of an object by a FMCW (Frequency Modulated Continuous Wave) method.

The finder 14 is a LIDAR (Light Detection and Ranging, or Laser Imaging Detection and Ranging) that measures scattered light with respect to irradiation light and that detects a distance to a target. One or more finders 14 are attached to an arbitrary part of the vehicle M.

The object recognition device 16 performs a sensor fusion process with respect to a detection result by part or all of the camera 10, the radar device 12, and the finder 14 and recognizes the position, the category, the speed, and the like of the object. The object recognition device 16 outputs the recognition result to the automated driving control unit 100.

The communication device 20 communicates with another vehicle that is present in the vicinity of the vehicle M, for example, by using a cellular network, a Wi-Fi network, Bluetooth (registered trademark), DSRC (Dedicated Short Range Communication), or the like or communicates with a variety of server apparatuses via a wireless base station. The communication device 20 communicates with a terminal apparatus that is carried by a person outside the vehicle.

The HMI 30 presents a variety of information to an occupant inside the vehicle and receives an input operation by the occupant. The HMI 30 includes, for example, a variety of display devices, a speaker, a buzzer, a touch panel, a switch, a key, and the like.

The navigation device 50 includes, for example, a GNSS (Global Navigation Satellite System) receiver 51, a navigation HMI 52, and a route determination unit 53. The navigation device 50 holds first map information 54 in a storage device such as a HDD (Hard Disk Drive) or a flash memory. The GNSS receiver identifies the position of the vehicle M on the basis of a signal that is received from the GNSS satellite. The position of the vehicle M may be identified or supplemented by an INS (Inertial Navigation System) that utilizes an output of the vehicle sensor 70. The navigation HMI 52 includes a display device, a speaker, a touch panel, a key, and the like. Part or all of the navigation HMI 52 may be shared with the HMI 30 described above. The route determination unit 53 determines, with reference to the first map information 54, for example, a route (including, for example, information regarding a transit point when traveling to a destination) from the position (or an input arbitrary position) of the vehicle M that is identified by the GNSS receiver 51 to a destination that is input by the occupant by using the navigation HMI 52. The first map information 54 is, for example, information in which a road shape is described by a link indicating a road and a node that is connected by the link. The first map information 54 may include the curvature of a road, POI (Point Of Interest) information, and the like. The route that is determined by the route determination unit 53 is output to the MPU 60. The navigation device 50 may perform a route guide using the navigation HMI 52 on the basis of the route that is determined by the route determination unit 53. The navigation device 50 may be realized by, for example, a function of a terminal apparatus such as a smartphone or a tablet terminal that is held by the user. The navigation device 50 may transmit the current position and the destination to a navigation server via the communication device 20 and may acquire a route which is returned from the navigation server.

The MPU 60 functions, for example, as a recommended lane determination part 61. The MPU 60 holds second map information 62 in a storage device such as an HDD or a flash memory. The recommended lane determination part 61 divides the route that is supplied from the navigation device 50 into a plurality of blocks (for example, divides at an interval of 100 [m] with respect to a vehicle proceeding direction) and determines a recommended lane for each block with reference to the second map information 62. The recommended lane determination part 61 determines, for example, which lane from the left the vehicle should travel on. When a branching point, a merging point, or the like is present on the route, the recommended lane determination part 61 determines a recommended lane such that the vehicle M can travel on a reasonable travel route for proceeding to a branch destination.

The second map information 62 is map information having higher accuracy than the first map information 54.

The second map information 62 includes, for example, information of the center of a lane, information of the boundary of a lane, or the like. The second map information 62 may include road information, traffic regulation information, address information (address and zip code), facility information, phone number information, and the like. The road information includes information that represents the category of a road such as a freeway, a toll road, a national road, or a prefectural road and information of the number of lanes of a road, the region of an emergency parking area, the width of each lane, the gradient of a road, the position of a road (three-dimensional coordinate including the longitude, latitude, and height), the curvature of a curve of a lane, the positions of merging and branching points of a lane, a sign provided on a road, and the like. The second map information 62 may be updated as needed by accessing another apparatus using the communication device 20.

The vehicle sensor 70 includes a vehicle speed sensor that detects the speed of the vehicle M, an acceleration sensor that detects acceleration, a yaw rate sensor that detects an angular speed around a vertical axis, an azimuth sensor that detects the direction of the vehicle M, and the like. The acceleration sensor may detect, in more detail, the direction and the magnitude of longitudinal acceleration or transverse acceleration of the vehicle M.

The driving operation element 80 includes, for example, an accelerator pedal, a brake pedal, a shift lever, a steering wheel, and other operation elements. A sensor that detects the amount of operation or the presence or absence of operation is attached to the driving operation element 80. A detection result of the sensor is output to one or both of the automated driving control unit 100, and the travel drive force output device 200, the braking device 210 and the steering device 220.

The vehicle room inside camera 90 captures, for example, an image of an upper body of an occupant who is seated on the seat apparatus 300 such that the face of the occupant is at the center position. The vehicle room inside camera 90, for example, periodically and repeatedly captures an image of the occupant. The captured image of the vehicle room inside camera 90 is output to the automated driving control unit 100.

[Automated Driving Control Unit]

The automated driving control unit 100 includes, for example, a first control part 120, a second control part 140, an interface control part 150, and a seat control part 160. Each of the first control part 120, the second control part 140, the interface control part 150, the seat control part 160, and a travel state recognition part 170 is realized by executing a program (software) by a processor such as a CPU (Central Processing Unit). Part or all of the functional parts of the first control part 120, the second control part 140, the interface control part 150, the seat control part 160, and the travel state recognition part 170 described below may be realized by hardware such as a LSI (Large Scale Integration), an ASIC (Application Specific Integrated Circuit), or a FPGA (Field-Programmable Gate Array) or may be realized by the cooperation of software and hardware.

The first control part 120 includes, for example, an outside recognition unit 121, a vehicle position recognition unit 122, and an action plan generation unit 123.

The outside recognition unit 121 recognizes the state of the position, speed, acceleration, and the like of a peripheral vehicle on the basis of information that is input via the object recognition device 16 from the camera 10, the radar device 12, and the finder 14. The position of a peripheral vehicle may be represented by a representative point such as a center of gravity or a corner of the peripheral vehicle or may be represented by a region described by the outline of the peripheral vehicle. The "state" of a peripheral vehicle may include the acceleration, jerk, or "action state" (for example, whether or not the peripheral vehicle is changing a lane, or whether or not the peripheral vehicle will change a lane) of the peripheral vehicle.

The outside recognition unit 121 may recognize positions of a guardrail, a power pole, a parked vehicle, a person such as a pedestrian, and other objects in addition to a peripheral vehicle.

The vehicle position recognition unit 122 recognizes, for example, the lane (travel lane) on which the vehicle M is travelling, and the relative position and the attitude of the vehicle M with respect to the travel lane. The vehicle position recognition unit 122 recognizes the travel lane, for example, by comparing a pattern (for example, the arrangement of a solid line and a dashed line) of a road partition line that is obtained from the second map information 62 to a pattern of a road partition line in the vicinity of the vehicle M that is recognized from the image captured by the camera 10. The position of the vehicle M that is acquired from the navigation device 50 and the process result by the INS may be added to this recognition.

Figure 2:
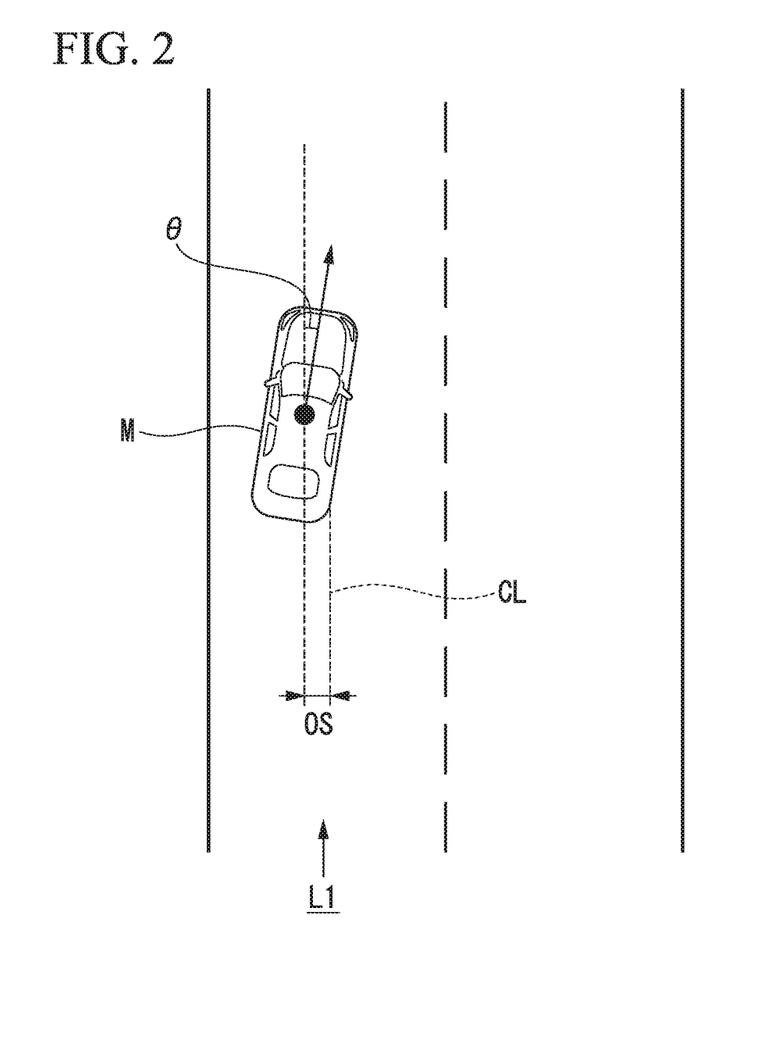
FIG. 2 is a view showing a state in which a relative position and an attitude of a vehicle with respect to a travel lane are recognized by a vehicle position recognition unit.

Then, the vehicle position recognition unit 122 recognizes, for example, the position and the attitude of the vehicle M with respect to the travel lane. FIG. 2 is a view showing a state in which the relative position and the attitude of the vehicle M with respect to a travel lane L1 are recognized by the vehicle position recognition unit 122. The vehicle position recognition unit 122 recognizes, for example, as the relative position and the attitude of the vehicle M with respect to the travel lane L1, a gap OS of a reference point (for example, the center of gravity) of the vehicle M from a travel lane center CL and an angle θ that is formed of the proceeding direction of the vehicle M and a line formed of the continued travel lane centers CL. Alternatively, the vehicle position recognition unit 122 may recognize, as the relative position of the vehicle M with respect to the travel lane, the position of the reference point of the vehicle M with respect to any of side end parts of the travel lane L1 or the like. The relative position of the vehicle M that is recognized by the vehicle position recognition unit 122 is supplied to the recommended lane determination part 61 and the action plan generation unit 123.

The action plan generation unit 123 generates an action plan for the vehicle M to perform automated driving with respect to a destination or the like. For example, the action plan generation unit 123 determines events that are sequentially performed in an automated driving control so as to travel on the recommended lane that is determined by the recommended lane determination part 61 and so as to be capable of responding to peripheral circumstances of the vehicle M. Examples of the event in the automated driving of the embodiment include a constant speed travel event of traveling on the same travel lane at a constant speed, a lane-change event of changing the travel lane of the vehicle M, an overtaking event of overtaking a frontward traveling vehicle, a follow-up travel event of traveling while following up a frontward traveling vehicle, a merging event that causes the vehicle to merge at a merging point, a branching event that causes the vehicle M to travel to a target direction at a branching point of a road, an emergency stop event that causes the vehicle M to stop urgently, a handover event for finishing automated driving and switching to manual driving, and the like. Further, there may be also cases in which an action for avoidance is planned on the basis of peripheral circumstances (presence of a peripheral vehicle or a pedestrian, lane narrowing due to a roadwork, or the like) of the vehicle M during performing the events.

The action plan generation unit 123 generates a target trajectory on which the vehicle M will travel. The target trajectory includes, for example, a speed element. For example, a plurality of future reference times are set at each predetermined sampling time (for example, about several hundred milliseconds), and the target trajectory is generated as a set of target points (trajectory points) at which the vehicle should arrive at the reference times. Therefore, when the spacing of the trajectory points is large, the large spacing of the trajectory points indicates that the vehicle travels in the zone between the trajectory points at a high speed.

Figure 3:
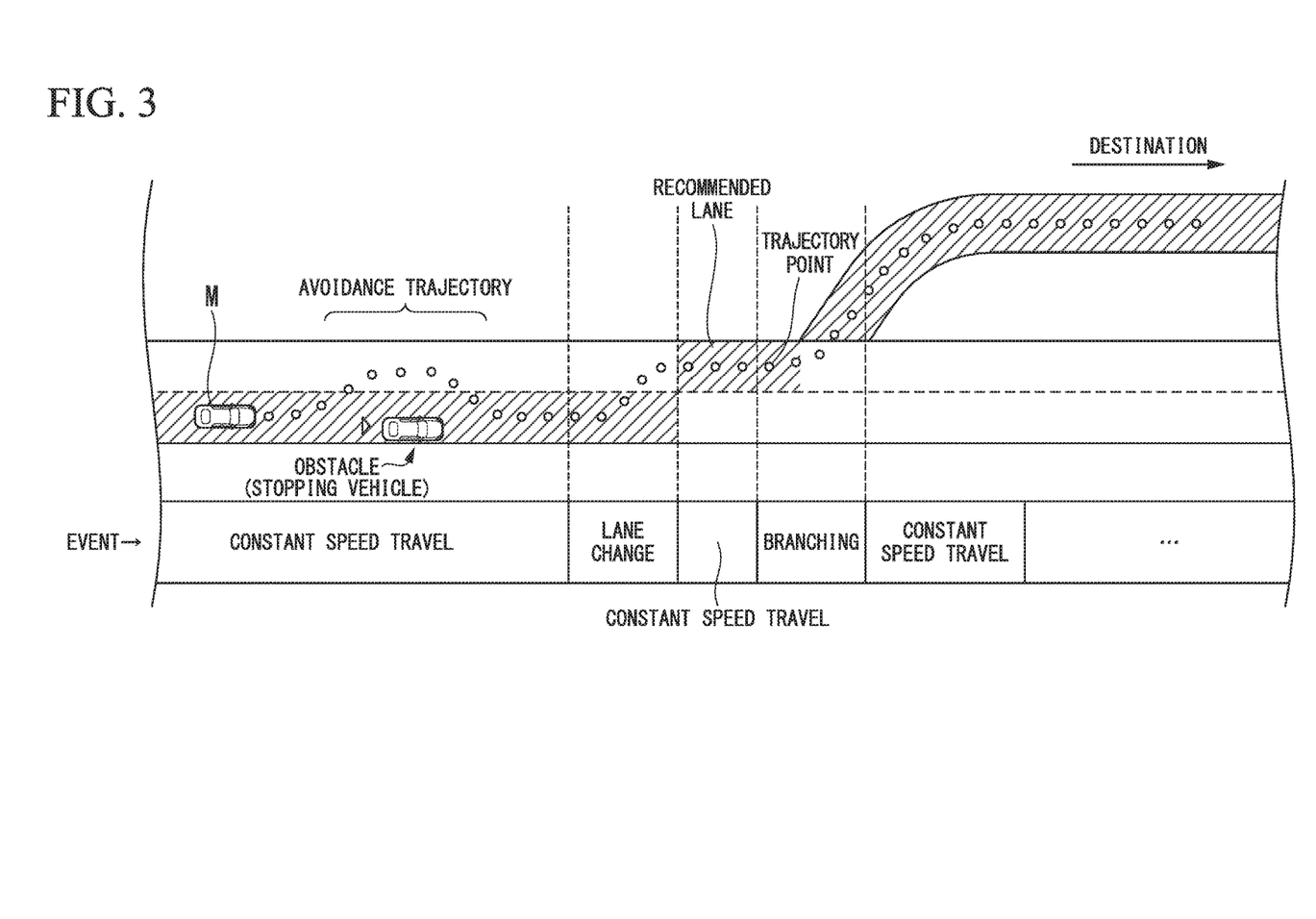
FIG. 3 is a view showing a state in which a target trajectory is generated on the basis of a recommended lane.

FIG. 3 is a view showing a state in which a target trajectory is generated on the basis of a recommended lane. As shown in FIG. 3, the recommended lane is set such that it is convenient to travel along a route to a destination.

When arriving at a position (the position may be determined in accordance with the category of an event) by a predetermined distance before a point at which the recommended lane is switched, the action plan generation unit 123 starts a lane-change event, a branching event, a merging event, and the like. When it becomes necessary to avoid an obstacle during performing the events, an avoidance trajectory is generated as shown in FIG. 3.

The action plan generation unit 123 generates, for example, a plurality of candidates of the target trajectory and selects an optimum target trajectory that is suitable for the route to the destination at that time point on the basis of a point of view of safety and efficiency.

The second control part 140 includes, for example, a travel control unit 141 and a switch control unit 142. The travel control unit 141 controls the travel drive force output device 200, the braking device 210, and the steering device 220 such that the vehicle M passes through the target trajectory that is generated by the action plan generation unit 123 exactly at a scheduled time.

The switch control unit 142 switches between drive modes of automated driving and manual driving mutually, for example, on the basis of a signal that is input from an automated driving switch provided on a variety of operation switches of the HMI 30 or the like. The switch control unit 142 switches the drive mode of the vehicle M from automated driving to manual driving, for example, on the basis of an operation to command acceleration/deceleration or steering with respect to the driving operation element 80 such as an accelerator pedal, a brake pedal, or a steering wheel. The switch control unit 142 switches between automated driving and manual driving mutually on the basis of the action plan that is generated by the action plan generation unit 123. During manual driving, input information from the driving operation element 80 is output to the travel drive force output device 200, the braking device 210, and the steering device 220. The input information from the driving operation element 80 may be output via the automated driving control unit 100 to the travel drive force output device 200, the braking device 210, and the steering device 220. Each of ECUs (Electronic Control Unit) of the travel drive force output device 200, the braking device 210, and the steering device 220 performs an operation of manual driving with respect to each device on the basis of the input information from the driving operation element 80 and the like.

The interface control part 150 causes the HMI 30 to output a travel state during automated driving or during manual driving of the vehicle M, a timing at which automated driving and manual driving are mutually switched, notification regarding a request and the like for causing an occupant to perform manual driving, and the like. The interface control part 150 may cause the HMI 30 to output information regarding a control content by the seat control part 160. The interface control part 150 may output information that is received by the HMI 30 to the first control part 120 or the seat control part 160.

The seat control part 160 controls the attitude and the like of the seat apparatus 300 when the switch control unit 142 switches between automated driving and manual driving or on the basis of a command from the occupant by the interface control part 150. The seat control part 160 controls at least one of the position and the direction of the seat apparatus 300 in accordance with driving modes of automated driving and manual driving. Details of the function of the seat control part 160 are described below.

The travel drive force output device 200 outputs, to a drive wheel, a travel drive force (torque) by which the vehicle travels. The travel drive force output device 200 includes, for example, the combination of an internal combustion engine, an electric motor, a transmission, and the like and an ECU that controls the internal combustion engine, the electric motor, the transmission, and the like. The ECU controls the above configuration in accordance with information that is input from the travel control unit 141 or information that is input from the driving operation element 80.

The braking device 210 includes, for example, a brake caliper, a cylinder that transmits an oil pressure to the brake caliper, an electric motor that generates the oil pressure at the cylinder, and a brake ECU. The brake ECU controls the electric motor in accordance with the information that is input from the travel control unit 141 or the information that is input from the driving operation element 80 and allows a braking torque corresponding to a braking operation to be output to each wheel. The braking device 210 may include, as a backup, a mechanism that transmits, to the cylinder via a master cylinder, an oil pressure that is generated by an operation of the brake pedal which is included in the driving operation element 80. The braking device 210 is not limited to the configuration described above and may be an electronically-controlled hydraulic braking device that controls an actuator in accordance with the information which is input from the travel control unit 141 or the information that is input from the driving operation element 80 and that transmits the oil pressure of the master cylinder to the cylinder. The braking device 210 may include a plurality of braking device systems in consideration of safety.

The steering device 220 includes, for example, a steering ECU and an electric motor.

The electric motor, for example, applies a force to a rack and pinion mechanism and changes the direction of a steering wheel. The steering ECU drives the electric motor and changes the direction of the steering wheel in accordance with the information that is input from the travel control unit 141 or the information that is input from the driving operation element 80.

The seat apparatus 300 is a seat on which the occupant of the vehicle M is seated and is a seat that can be electrically driven. The seat apparatus 300 includes a driver seat for seating so as to drive the vehicle M manually by using the driving operation element 80, a passenger seat that is provided next to the driver seat, a rear seat provided at a rear part of the driver seat or the passenger seat, and the like. In the following description, the "seat apparatus 300" is the driver seat. A specific configuration of the seat apparatus 300 is described below.

[Configuration of Seat Apparatus 300 and Rotation Control in Yaw Direction]

Hereinafter, the configuration of the seat apparatus 300 of the embodiment and a rotation control in a yaw direction on the basis of a drive state of the vehicle M are described. It is assumed that the rotation in the yaw direction of the seat apparatus 300 is performable, for example, when performing a drive mode which has a high degree of automated driving and in which the occupant is capable of allowing the vehicle M to travel without operating the driving operation element 80. In the following description, the frontward, rearward, rightward, and leftward directions represent a direction with respect to the vehicle M. For example, the frontward direction is a front direction of the vehicle M.

Figure 4:
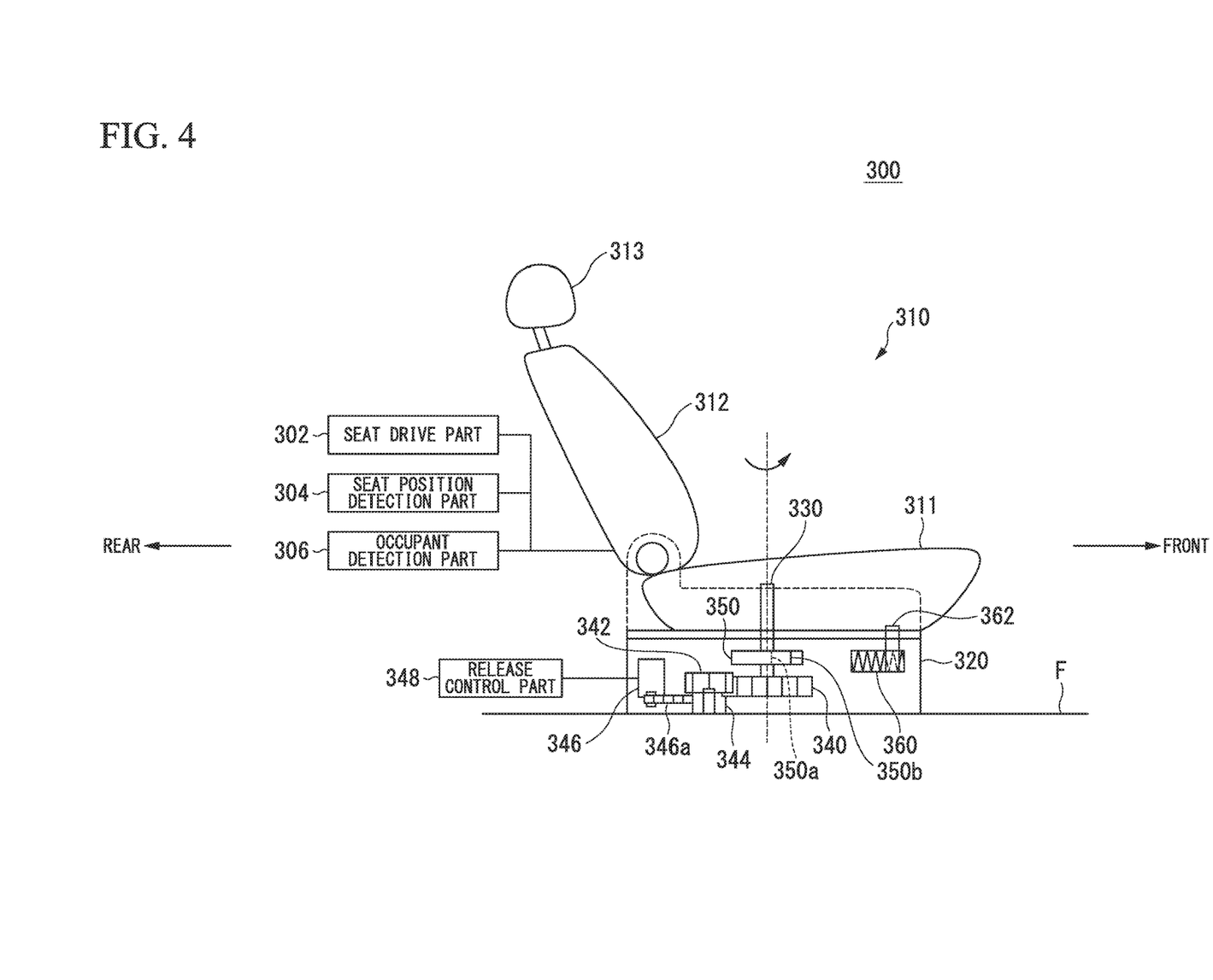
FIG. 4 is a view showing an example of a configuration of a seat apparatus.

FIG. 4 is a view showing an example of a configuration of the seat apparatus 300. The seat apparatus 300 includes, for example, a seat drive part 302, a seat position detection part 304, an occupant detection part 306, a seat main body 310, a base part 320, a shaft part 330, a first gear 340, a second gear 342, a first motor 344, a second motor 346, a release control part 348, a biasing part 350, and a regulation part 360. The first motor 344 is an example of a "rotation mechanism".

The seat drive part 302 drives a motor or the like by a control of the seat control part 160 and changes at least one of the position and the direction of the seat main body 310. For example, the seat drive part 302 drives the first motor 344 and rotates the seat main body 310 in the yaw direction. The seat drive part 302 may drive a motor (not shown) and allow the seat main body 310 to slide in frontward and rearward directions. The seat drive part 302 may drive a motor (not shown) and move a backrest part (seat back) 312 such that a reclining angle of the seat main body 310 is increased or decreased.

The seat position detection part 304 detects, for example, the direction of the seat main body 310 in the yaw direction. The seat position detection part 304 may detect the slide position and the reclining angle of the seat main body 310. The seat position detection part 304 outputs the detected result to the seat control part 160.

The occupant detection part 306 detects that an occupant is seated on the seat main body 310. The occupant detection part 306 detects that an occupant is seated on the seat main body 310, for example, when a load that is detected by one or more load sensors which are provided on a seating part 311 (seat cushion) or the backrest part 312 is equal to or more than a threshold value. The occupant detection part 306 may detect that the pose of the occupant is changed on the basis of the change amount of the load sensor.

The seat main body 310 includes, for example, the seating part 311, the backrest part 312, and a head rest 313. The seating part 311 is a part on which an occupant is seated. The backrest part 312 supports the back of the occupant who is seated on the seating part 311. The head rest 313 supports the head of the occupant who is seated on the seating part 311. The backrest part 312 is joined to the seating part 311. The head rest 313 is joined to the backrest part 312. Accordingly, for example, when the seat drive part 302 rotates the seating part 311 in the yaw direction, the backrest part 312 and the head rest 313 are also rotated together with the seating part 311.

The base part 320 is provided on a floor surface F of the vehicle M and supports the seat main body 310.

The base part 320 houses the first gear 340, the second gear 342, the first motor 344, the second motor 346, the release control part 348, the biasing part 350, and the regulation part 360.

The shaft part 330 is rotated with reference to a direction that is orthogonal to the floor surface F. The shaft part 330 is joined to the seating part 311. The shaft part 330 is joined to the first gear 340. The shaft part 330 is rotated by the rotation of the first gear 340. The shaft part 330 is rotated, and thereby, the seat main body 310 that includes the seating part 311 which is joined to the shaft part 330 is rotated in a yaw direction.

The first gear 340 is, for example, a spur gear. The tooth top of the first gear 340 is formed so as to be capable of being engaged with the tooth top of the second gear 342. The second gear 342 is rotated by the first motor 344 in a state where the first gear 340 is engaged with the second gear 342, and thereby, the first gear 340 is rotated. The shaft part 330 is rotated by the rotation of the first gear 340, and the seat main body 310 that is joined to the shaft part is rotated around the shaft part 330 as a rotation axis.

The second gear 342 is a gear capable of being engaged with the first gear 340 and is, for example, a spur gear. The second gear 342 is rotated in a predetermined direction by the driving of the first motor 344. The first motor 344 is a driving part for rotating the seat main body 310 in a yaw direction around the shaft part 330. The first motor 344 rotates the second gear 342 by the control of the seat drive part 302.

The second motor 346 moves a rack 346a by the control of the release control part 348 and moves the first motor 344 that is joined to a front end of the rack 346a. Thereby, the second gear 342 that is joined to the first motor 344 is also moved. Details of the movement are described below.

The release control part 348 drives the second motor 346 by the control of the seat control part 160 and moves positions of the first motor 344 and the second gear 342.

The biasing part 350 is, for example, a volute spring. One end 350a of the biasing part 350 is joined to the shaft part 330, and the other end 350b of the biasing part 350 is joined to the base part 320. When the seat main body 310 is rotated by the first gear 340 by the driving of the first motor 344, the spring is wound and tightened, and the biasing part 350 applies a biasing force in a direction that is opposite to the rotation direction. This biasing force is greater than a force of the rotation of the shaft part 330 by the rotation of the second gear 342. Accordingly, the biasing force of the biasing part 350 can rotate the seat main body 310 at a higher speed than the first motor 344.

Details of the function of the biasing part 350 are described below.

The regulation part 360 includes, for example, a damper member. When the seat main body 310 is rotated by the biasing force by the biasing part 350, the regulation part 360 reduces the rotation speed such that the seat main body 310 is stopped in a reference direction (for example, a frontward direction (front) of the vehicle M) immediately before the seat main body 310 becomes directed to the reference direction. For example, the regulation part 360 prevents the movement of a pin (protrusion part) 362 that is joined to the seating part 311 and thereby reduces the rotation speed of the seat main body 310. Details of the function of the regulation part 360 are described below.

Figure 5:
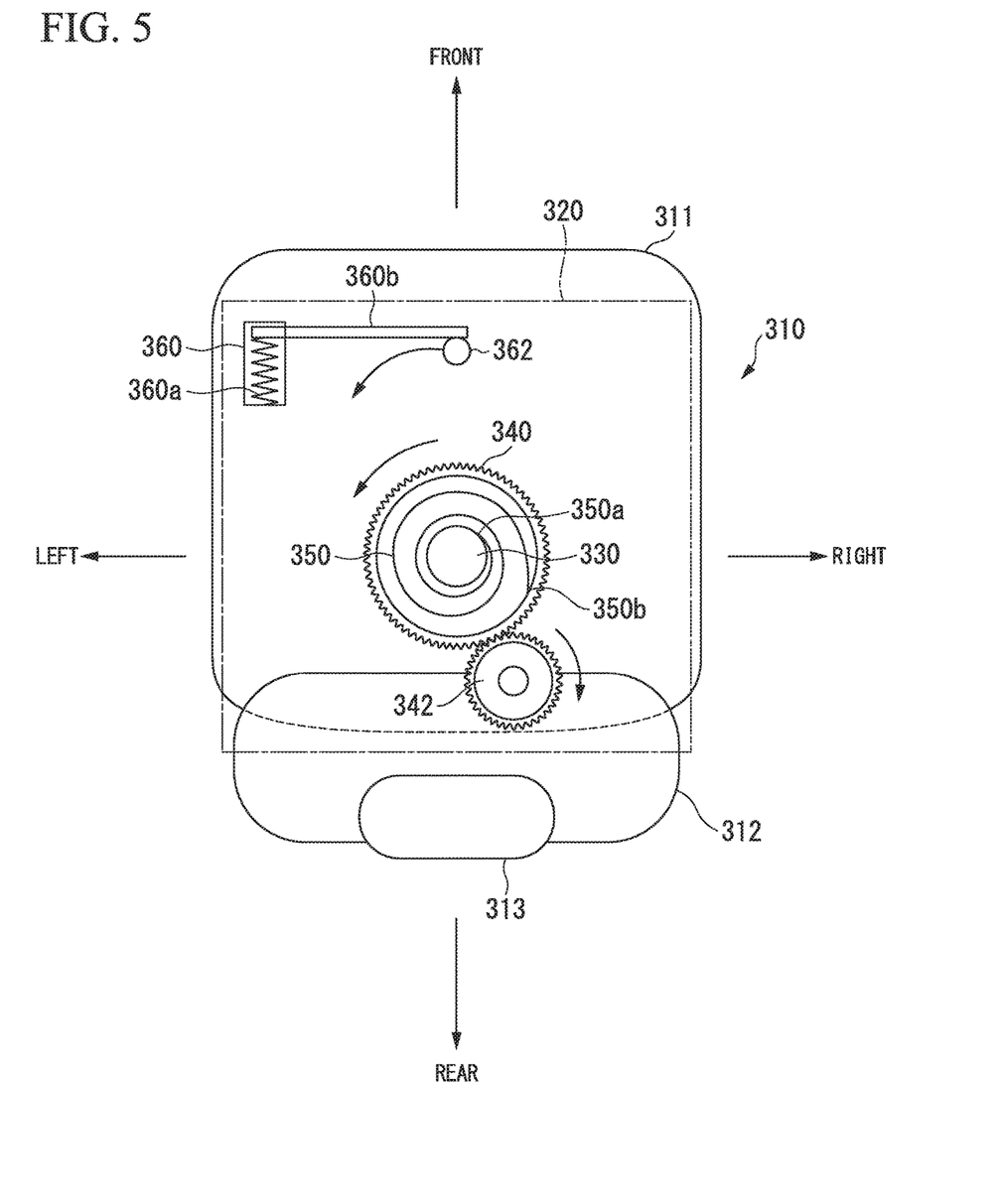
FIG. 5 is a view showing a state in which a seat main body is rotated by the rotation of a first gear.

FIG. 5 is a view showing a state in which the seat main body 310 is rotated by the rotation of the first gear 340. In the following, operations of the first gear 340, the second gear 342, the biasing part 350, and the regulation part 360 are mainly described. The example of FIG. 5 shows a state in which the first gear 340 is engaged with the second gear 342. Accordingly, the seat main body 310 is fixed by the second gear 342.

For example, when the vehicle M is performing automated driving, the occupant operates the HMI or the like and rotates the seat main body 310 of the driver seat in a yaw direction. When receiving a rotation command in the yaw direction from the HMI 30, the seat control part 160 outputs a command to allow the seat drive part 302 to the drive the first motor 344. The seat drive part 302 drives the first motor 344 and rotates the second gear 342. Thereby, the first gear 340 that is engaged with the second gear 342 is rotated, and the seat main body 310 together with the shaft part 330 is rotated around the shaft part 330. In the example of FIG. 5, the second gear 342 is rotated in a right direction, and therefore, the first gear 340 is rotated in a left direction.

The spring is wound and tightened in accordance with the rotation of the seat main body 310, and the biasing part 350 applies a biasing force in a direction that is opposite to the rotation direction. The biasing part 350 is provided at a position where the biasing part 350 is whirled around the shaft part 330. Thereby, the biasing part 350 easily applies a biasing force to the rotation shaft that rotates the seat main body 310 in a yaw direction. Accordingly, it is possible to efficiently apply a biasing force to the rotation shaft.

The regulation part 360 includes a spring 360a and a prevention member 360b. For example, one end of the spring 360a is joined to a housing of the regulation part 360 or the base part 320, and the other end of the spring 360a is joined to the prevention member 360b. The prevention member 360b is a member having a rod shape or a plate shape that comes into contact with the pin 362. When the prevention member 360b and the pin 362 are in contact with each other, the regulation part 360 applies a biasing force in a rearward direction with respect to the pin 362 by the spring 360a. In the example of FIG. 5, the first gear 340 and the second gear 342 are engaged with each other, and therefore, the seat main body 310 is not rotated by the biasing force that is applied by the spring 360a.

Figure 6:
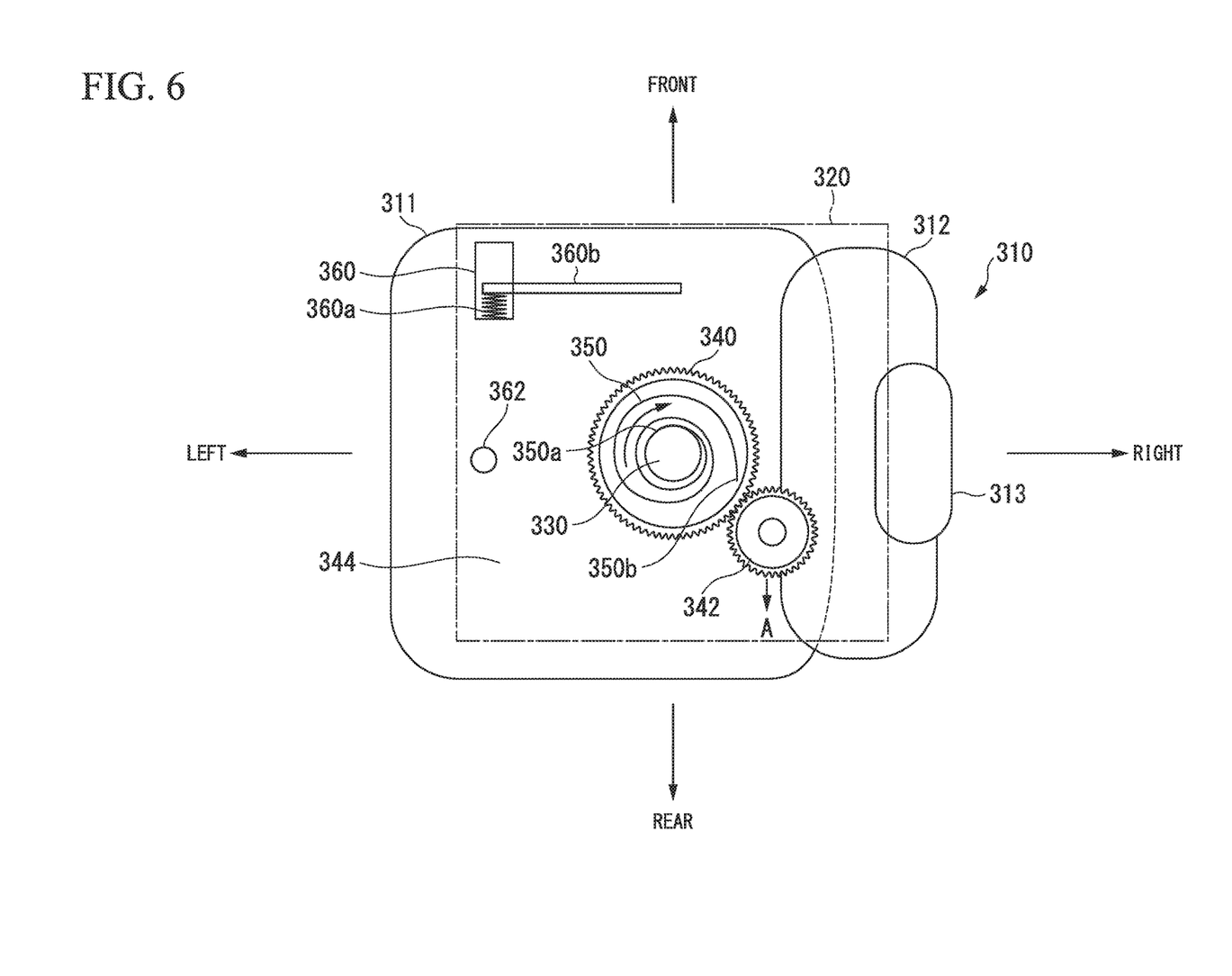
FIG. 6 is a view showing an example in which a second gear is rotated by a first motor, and the seat main body is rotated left by 90°.

FIG. 6 is a view showing an example in which the second gear is rotated by the first motor, and the seat main body 310 is rotated left by 90°. In the example of FIG. 6, although a biasing force is applied to the biasing part 350 in a direction (right rotation direction) opposite to the direction rotated around the shaft part 330, the first gear 340 is fixed in a state where the first gear 340 is engaged with the second gear 342, and therefore, the biasing part 350 is maintained in a state of not being rotated by the biasing force. When the seat main body 310 is rotated left by 90°, the prevention member 360b and the pin 362 becomes non-contact with each other.

For example, when the vehicle M switches the mode from automated driving mode to manual driving mode, the seat control part 160 outputs a control signal that performs a control to release the engagement between the first gear 340 and the second gear 342 to the release control part 348. The release control part 348 drives the second motor 346 to move the second gear 342 and the first motor 344 in an arrow A direction shown in FIG. 6 and allows the first gear 340 and the second gear 342 to be in a state (for example, a state in which the first gear 340 and the second gear 342 are non-contact) in which the first gear 340 and the second gear 342 are not engaged with each other. Thereby, the seat main body 310 is rotated in a direction opposite to the rotation direction by the first motor 344, by the biasing force that is preliminarily biased to the shaft part 330 by the biasing part 350. In this way, by using not the first motor 344 but the biasing force that is applied to the shaft part 330 by the biasing part 350, it is possible to rotate the seat main body 310 at a higher speed than that of the rotation of the seat main body 310 by the first motor 344. Accordingly, it is possible to allow the seat main body 310 to promptly return to the position at which the occupant can drive when the vehicle M is switched to manual driving. Further, the occupant can take a pose for performing manual driving early.

Figure 7:
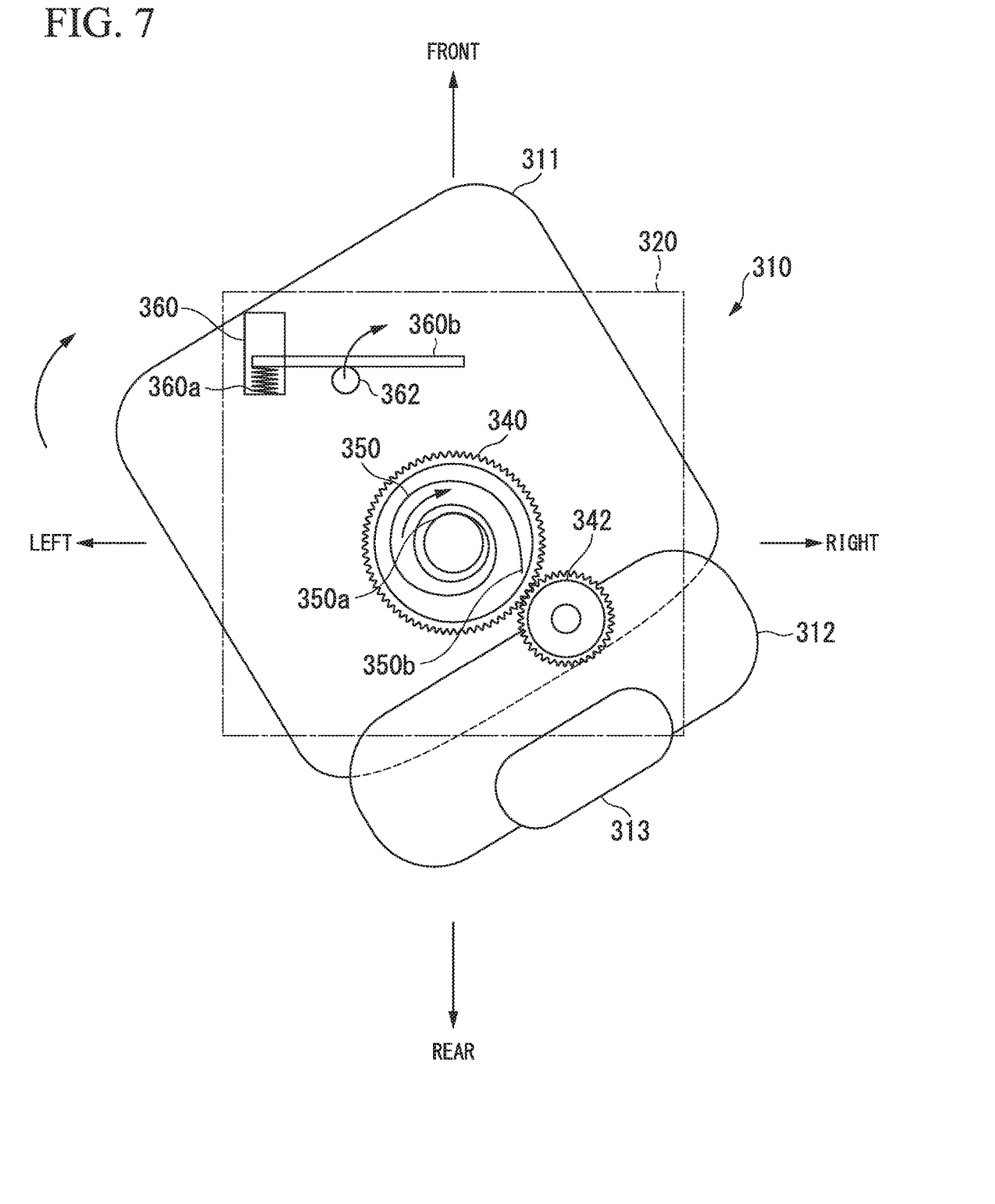
FIG. 7 is a view showing a state of the seat main body that is rotated by a biasing force applied by a biasing part.

FIG. 7 is a view showing a state of the seat main body 310 that is rotated by a biasing force which is applied to the shaft part 330 by the biasing part 350. The seat main body 310 is rotated right around the shaft part 330 by a biasing force that is applied to the shaft part 330 by the biasing part 350. At this time, the pin 362 comes into contact with the prevention member 360b. The prevention member 360b is pushed by the pin 362 and is moved in a frontward direction. At this time, the spring 360a is extended, and a biasing force in a rearward direction is applied to the pin 362. Thereby, the rotation speed of the seat main body 310 is reduced by the biasing force that is applied by the spring 360a to the pin 362. Accordingly, as the direction of the seat main body 310 approaches to the frontward direction, the rotation speed can be reduced, and it is possible to stop the seat main body 310 smoothly. In the embodiment, even when the rotation speed of the seat main body 310 is reduced by regulation part 360, the biasing part 350 is adjusted such that it is possible to allow the seat main body 310 to be directed to the frontward direction earlier than a case in which the second gear 342 is rotated by the first motor 344 to allow the seat main body 310 to be directed to the frontward direction.

The seat control part 160 outputs a release end signal to the release control part 348 when it is determined that the position of the seat main body 310 is positioned in the frontward direction by the seat position detection part 304.

When acquiring the release end signal from the seat control part 160, the release control part 348 drives the second motor 346, moves the second gear 342 and the first motor 344, and allows the second gear 342 and the first motor 344 to stop at a position where the second gear 342 becomes a state in which the second gear 342 is engaged with the first gear 340.

[Process Flow]

Figure 8:
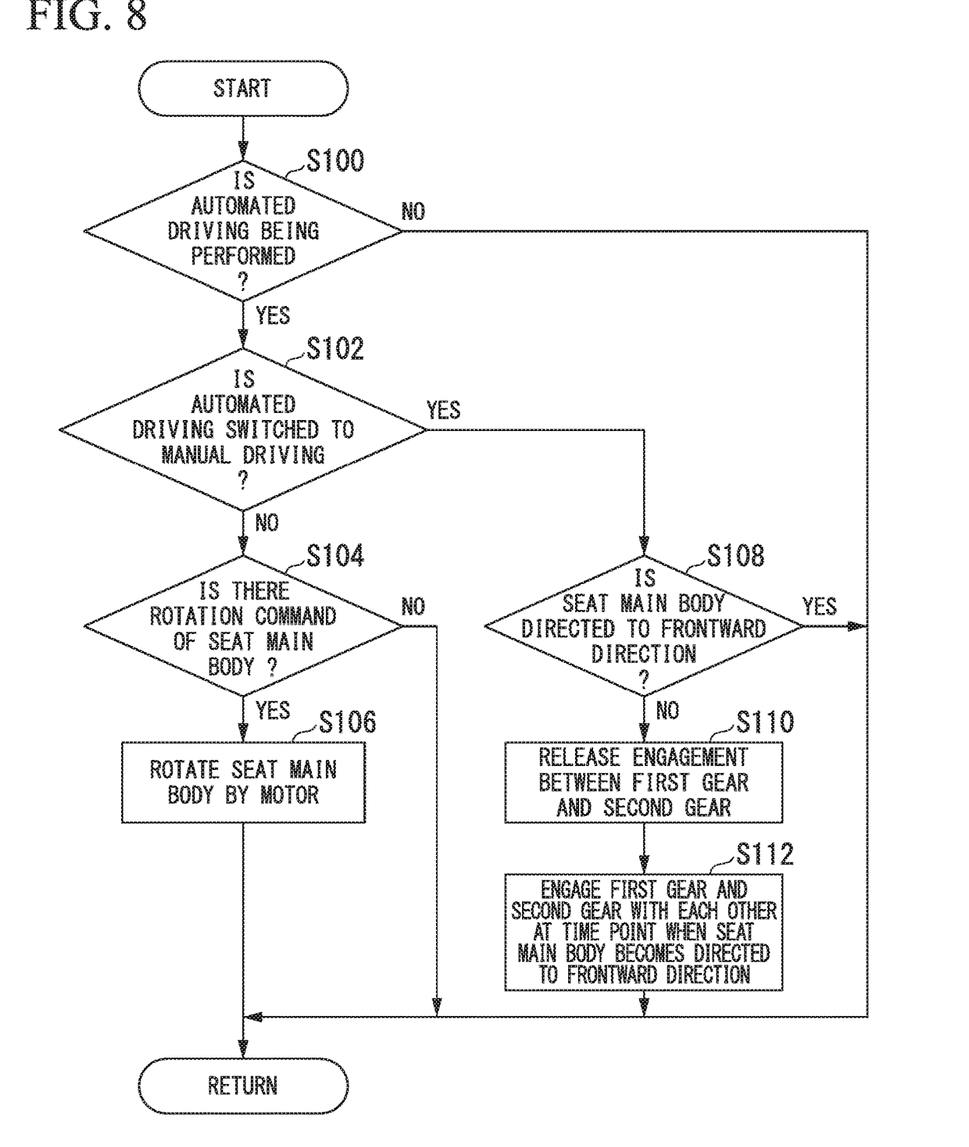
FIG. 8 is a flowchart showing an example of a rotation control process in a yaw direction of the seat main body.

Hereinafter, a rotation control process in a yaw direction of the seat main body 310 in the embodiment is described using a flowchart. FIG. 8 is a flowchart showing an example of the rotation control process in a yaw direction of the seat main body 310. The flowchart shown in FIG. 8 is repeatedly performed at a predetermined timing or cycle.

First, the seat control part 160 determines whether or not the vehicle M is performing automated driving (Step S100). When automated driving is being performed, the seat control part 160 determines whether or not automated driving is switched to manual driving (Step S102). When automated driving is not switched to manual driving, the seat control part 160 determines whether or not there is a rotation command to the seat main body 310 (Step S104). When there is a rotation command of the seat main body 310, the seat control part 160 drives the first motor 344 to rotate the second gear 342 and rotates the first gear 340 in a state of being engaged with the second gear 342. Thereby, the shaft part 330 is rotated, and the seat main body 310 is rotated (Step S106). The seat main body 310 is rotated, and thereby, the biasing part 350 applies a biasing force in a direction opposite to the rotation direction to the shaft part 330.

When automated driving is switched to manual driving, the seat control part 160 determines whether or not the seat main body 310 is directed to the frontward direction (Step S108). When the seat main body 310 is not directed to the frontward direction, the release control part 348 releases a state in which the first gear 340 and the second gear 342 are engaged with each other (Step S110). Thereby, the seat main body 310 rotates the shaft part 330 by a biasing force that is applied to the shaft part 330 by the biasing part 350, and the seat main body 310 is rotated. The release control part 348 allows the first gear 340 and the second gear 342 to be in a state in which the first gear 340 and the second gear 342 are again engaged with each other at a time point when the seat main body becomes directed to the frontward direction and fixes the seat main body 310, and the process of the present flowchart is finished. In the process of Step S100, when automated driving is not being performed, the process of the present flowchart is finished. In the process of Step S104, when there is not a rotation command of the seat main body 310, the process of the present flowchart is finished. In the process of Step S108, when the seat main body 310 is directed to the frontward direction, the process of the present flowchart is finished.

MODIFIED EXAMPLE

Figure 9:
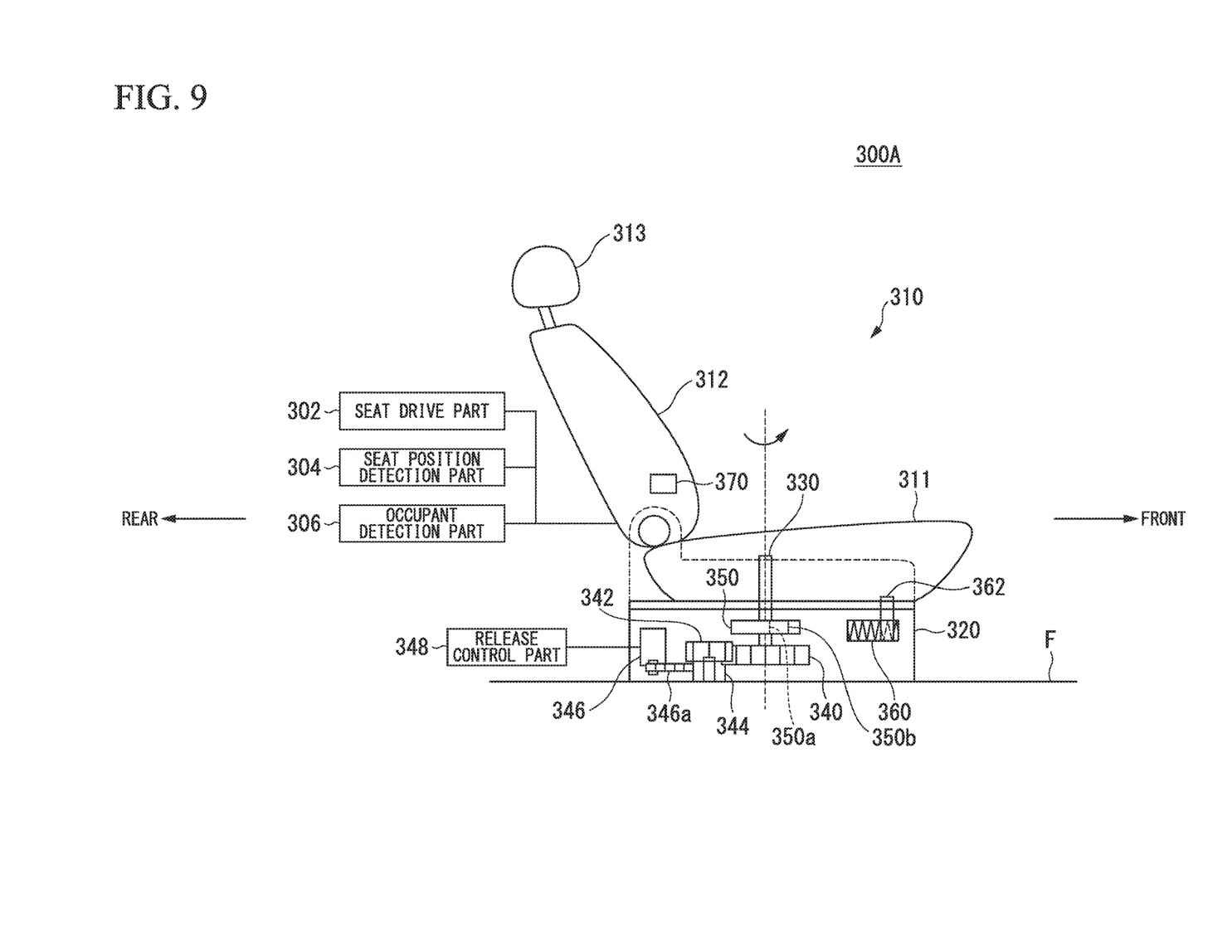
FIG. 9 is a view showing a modified example of a seat apparatus.

Next, a modified example of a seat apparatus is described. FIG. 9 is a view showing a modified example of a seat apparatus. A seat apparatus 300A shown in FIG. 9 is different in that a mechanical switch 370 is provided on the seat main body 310 in comparison with the seat apparatus 300 shown in FIG. 4. The mechanical switch 370 is an example of a "reception part". In the following, the mechanical switch 370 and the release control part 348 are mainly described.

The mechanical switch 370 is provided, for example, on the backrest part 312. The mechanical switch 370 may be a switch that switches between ON and OFF or may be a button, a lever, or the like.

When the occupant wants to allow the seat main body 310 to return to the original position (for example, a frontward direction) from a state in which the seat main body 310 is rotated in a yaw direction, the occupant operates the mechanical switch 370 that is provided on the seat main body 310. When the mechanical switch 370 receives an operation to allow the seat main body 310 to return to the frontward direction, the seat control part 160 outputs a command signal for releasing the engagement between the first gear 340 and the second gear 342 to the release control part 348. The release control part 348 drives the second motor 346 on the basis of the control signal from the seat control part 160, moves the second gear 342 and the first motor 344, and allows the first gear 340 and the second gear 342 to be in a state in which the first gear 340 and the second gear 342 are not engaged with each other. Thereby, an operation by the occupant to allow the direction of the seat main body 310 to return to the frontward direction is received, and then, it is possible to allow the seat main body 310 to be rotated. Further, the mechanical switch 370 is provided on the seat main body 310, and thereby, even when the seat main body 310 is in a state of being rotated in a direction different from the frontward direction, the occupant can easily operate the mechanical switch 370 in a state where the occupant is seated. The mechanical switch 370 may be provided on the seating part 311 or the head rest 313 or may be provided on the base part 320.

As another modified example, when automated driving is switched to manual driving, before the seat main body 310 is rotated, the interface control part 150 may notify information indicating that the seat main body 310 will be allowed to return to the frontward direction of the occupant from the HMI 30. The information indicating that the seat main body 310 will be allowed to return to the frontward direction may be, for example, a screen display of the HMI 30, may be a speech output, or may be the combination of a screen display and a speech output. After there is the notification from the HMI 30, the seat control part 160 may rotate the second gear 342 by the first motor 344 at a low speed in a reverse direction, allow the direction of the seat main body 310 to return to the frontward direction by a slight angle (for example, about 5 to 15 degrees), and then release the engagement between the second gear 342 and the first gear 340 and rotate the seat main body 310 by a biasing force that is applied to the shaft part 330 by the biasing part 350. Thereby, the occupant can be made aware that the seat main body will be rotated and return to the frontward direction before the seat main body 310 is rotated. Accordingly, it is possible to further improve safety with respect to the occupant.

As another modified example, the seat control part 160 may perform an inquiry about whether or not the seat main body 310 may be allowed to return to the frontward direction from the HMI 30 by the interface control part 150 and then may rotate the seat main body 310 when there is a response that the seat main body 310 is allowed to return to the frontward direction from the occupant. In this case, the seat control part 160 may determine that there is a response that the seat main body 310 is allowed to return to the frontward direction from the occupant on the basis of the operation result from the mechanical switch 370. The seat control part 160 may determine that there is a response that the seat main body 310 is allowed to return to the frontward direction from the occupant when a predetermined change is found in the pose of the occupant in the seat main body 310 by the occupant detection part 306. The predetermine change is, for example, a change to a pose in which the backrest part 312 is pushed or a change in the pose to incline the body so as to push the right side of the seating part 311. In this way, by waiting for a response from the occupant and rotating the seat main body 310, it is possible to further improve safety with respect to the occupant.

According to the vehicle seat apparatus in the embodiment described above, it is possible to allow the seat main body to promptly return to a position at which an occupant can drive. The vehicle seat apparatus described in the above embodiment may be applied to, for example, a passenger seat, a rear seat, and the like of a vehicle other than an automated driving vehicle.

Although an embodiment of the invention has been described with reference to the drawings, the present invention is not limited to the embodiment, and a variety of changes and substitutions can be added without departing from the scope of the invention.

What is claimed is:

1. A vehicle seat apparatus comprising:
   a seat main body configured to seat an occupant;
   a first gear that is joined to the seat main body;
   a second gear that is capable of being engaged with the first gear;
   a rotation mechanism that rotates the second gear in a state of being engaged with the first gear and that rotates the seat main body in a yaw direction from a reference direction;
   a biasing part that applies, when the seat main body is rotated by the rotation mechanism, a biasing force in a direction that is opposite to a rotation direction;

a release control part that releases an engagement between the first gear and the second gear, that rotates the seat main body by a biasing force which is preliminarily biased by the biasing part, and that allows the seat main body to return to the reference direction; and a regulation part that regulates a rotation speed of the seat main body as a direction of the seat main body approaches to the reference direction when the biasing part allows the seat main body to return to the reference direction.

2. The vehicle seat apparatus according to claim 1, wherein the biasing part applies a biasing force to a rotation shaft that rotates the seat main body in a yaw direction.

3. The vehicle seat apparatus according to claim 1, wherein the release control part releases the engagement between the first gear and the second gear when automated driving in which at least one of acceleration/deceleration and steering of a vehicle is automatically controlled is switched to manual driving.

4. The vehicle seat apparatus according to claim 1, further comprising an information output part which notifies that the seat main body will be rotated of an occupant before the release control part releases the engagement between the first gear and the second gear.

5. The vehicle seat apparatus according to claim 1, further comprising a reception part that receives an operation by the occupant, wherein the release control part releases the engagement between the first gear and the second gear when an operation that allows the seat main body to return to the reference direction is received by the reception part.

6. The vehicle seat apparatus according to claim 1, wherein the release control part allows the first gear and the second gear to be in an engaged state when the seat main body returns to the reference direction.

7. The vehicle seat apparatus according to claim 1, wherein the release control part rotates the direction of the seat main body to the reference direction by a predetermined angle using the rotation mechanism and then releases the engagement between the first gear and the second gear.

\* \* \* \* \*